United States Patent [19]

Berger

[11] Patent Number: 4,762,251

[45] Date of Patent: Aug. 9, 1988

[54] RATIO MEASURING CUP

[75] Inventor: Martin J. Berger, Dobbs Ferry, N.Y.

[73] Assignee: Pepsico Inc., Purchase, N.Y.

[21] Appl. No.: 881,447

[22] Filed: Jun. 27, 1986

[51] Int. Cl.$^4$ .......................... B67D 5/22; B67D 5/06; B67D 5/56; G09F 9/00

[52] U.S. Cl. ........................................ 222/49; 222/23; 222/129; 222/158; 116/321; 141/94

[58] Field of Search ..................... 222/49, 50, 47, 129, 222/158; 116/321, 323, 324; 73/426, 427, 428; 141/95, 94; 422/100, 102

[56] References Cited

U.S. PATENT DOCUMENTS

| | | |
|---|---|---|
| 662,273 | 11/1900 | Hinkelbein ........................... 73/427 |
| 2,556,782 | 6/1951 | Venters ........................... 222/129 X |
| 2,982,446 | 5/1961 | Liolios ................................... 222/145 |
| 3,001,397 | 9/1961 | Leonard . |
| 3,699,815 | 10/1972 | Holbrook . |
| 3,831,453 | 8/1974 | McWhorter . |
| 3,948,105 | 4/1976 | Johnson, Jr. . |
| 3,988,857 | 11/1976 | Baumann . |
| 4,062,228 | 12/1977 | Peak . |
| 4,293,008 | 10/1981 | Coleman ........................... 141/95 |
| 4,445,370 | 5/1984 | Whitmire ........................... 73/428 |

Primary Examiner—Joesph J. Rolla
Assistant Examiner—Lisa C. Waag
Attorney, Agent, or Firm—Scully, Scott, Murphy & Presser

[57] ABSTRACT

A dual chamber Brix measuring cup which can be used to determine whether a fountain syrup dispenser is dispensing the proper ratio of water to syrup, referred to a a Brix measurement. The cup is basically two abutting cylindrical chambers, one to receive water dispensed from the nozzle and the other adapted to receive the syrup by means of a diverter tube. The cross sectional areas of the water and syrup chambers are in the ratio of the ideal water to syrup ratio in the dispensed product. In a first embodiment, a series of calibrated marks are provided on each of the two chambers, such that the mismatch of column heights can be translated into a reading of acceptability, for example if the syrup and water heights are within two lines of each other, that enable a tolerance band of acceptable mismatches to be easily seen visually. In a second embodiment, a slider element is provided which is vertically slideable on the syrup chamber. A calibration mark thereon is aligned with the syrup height, and when the water height falls within a tolerance range marked on the slider element, an acceptable ratio is indicated.

4 Claims, 4 Drawing Sheets (ACCEPTABLE READING)

(UNACCEPTABLE READING)

RATIO MEASURING CUP

BACKGROUND OF THE INVENTION

1. Field of the Invention

The present invention relates generally to a dual chamber ratio measuring cup which is used to determine whether a post mix beverage dispenser is dispensing the proper ratio of water to syrup (which is often referred to nontechnically and loosely as a Brix ratio). More particularly, the subject invention pertains to a ratio measuring cup which is relatively simple to use and read, and which gives a direct indication, at different liquid levels therein, as to whether a post mix beverage dispenser is dispensing a satisfactory ratio of water to syrup.

2. Discussion of the Prior Art

The prior art discloses several different technical approaches to determine whether a post mix beverage dispenser is dispensing the proper ratio of water to syrup. Prior art arrangements employed for ratio measurements range from an elaborate refractometer to a simple measuring cup. The cup is basically two abutting cylindrical chambers, one to receive water dispensed from the dispensing nozzle and the other adapted to receive the syrup by means of a diverter tube. The cross sectional areas of the water and syrup chambers are normally in the ratio of the ideal water to syrup ratio in the dispensed product. In practice, the cup is held under the nozzle and when the fluid level in the water chamber reaches some arbitrary level therein, the technician removes the cup from beneath the dispenser. If the dispenser is functioning properly, the level of syrup in the syrup chamber will be at the same level as the water. Unfortunately, this practice does not take into consideration an acceptable tolerance of water to syrup ratios in the beverage. For example, if the desired ratio is 5 to 1, the specifications might provide that this ratio can be in an acceptable range anywhere from 4.9 to 1 to 5.1 to 1. In this type of existing ratio cup, there are no calibrations. The water and syrup columns either match or don't match, and no measurement of the mismatch is available.

Liolios et al U.S. Pat. No. 2,982,446 discloses a ratio measuring cup having two separate compartments with relative cross-sectional areas equal to a predetermined desirable relative proportional flow of syrup and water. If one or the other compartment fills faster, a variation relative to the most desirable mixture of syrup to water can be detected immediately. The patent also states that the two compartments may be provided with suitable indicia representing other desirable mixture ratios, in which case the predetermined relative cross-sectional areas would be different. In a multichambered cup graduate of the type disclosed in the Liolios et al patent, a separate graduate must be provided for each syrup ratio. The syrup is adjusted to the correct ratio by adjusting the dispensing nozzle until the water and syrup levels are equal. One disadvantage of this system is the need to provide a different graduate for each water/syrup ratio. This problem was corrected in another type of prior art graduate, also of the multi-chambered cup type, which has ratio graduations imprinted on one fluid chamber into which syrup is dispensed and a water-level line imprinted on the other fluid chamber into which water is dispensed. Thus, the operator fills the water chamber to a predetermined level, and then reads the water/syrup ratio from one of a series of syrup ratio graduations which corresponds to the level of the syrup chamber. One problem with this type of system is that it is difficult for the operator to turn off the dispensing nozzle at precisely the proper moment to align the water level with the water level line.

Coleman U.S. Pat. No. 4,293,008 discloses yet another embodiment of a prior art graduate, also of the multi-chambered cup type, having ratio graduations imprinted one one fluid chamber into which the syrup is dispensed and minimum and maximum water level lines imprinted on the other fluid chamber into which water is dispensed. Thus, the operator fills the water chamber to a level between the minimum and maximum water level lines, and then reads the water/syrup ratio from one of a series of syrup ratio graduations which corresponds to the level of the syrup in the syrup chamber. The Coleman patent is an improvement over the type of ratio cup discussed in the previous paragraph, and essentially improves upon that concept by replacing a single mark on the water chamber with minimum and maximum markings.

An essential difference of the ratio cup of the present invention relative to that of Coleman is that the present ratio cup does not provide a reading of the actual ratio, similar to Coleman, but provides only an indication as to whether the ratio is within acceptable given tolerance limits, and provides such an indication over a range of different water and syrup levels in the ratio cup.

SUMMARY OF THE INVENTION

Accordingly, it is a primary object of the present invention to simplify the measurement of the acceptability of a water/syrup ratio in a post mix beverage dispensing system, and which provides an indication as to whether a measured ratio is acceptable within given tolerance limits. It is a further object of the present invention to provide a syrup ratio graduate which can compensate for any time delay in shutting off the water and syrup such that it does not require a precisely controlled quantity of syrup and water to be dispensed in order to obtain an accurate ratio measurement.

A further object of the subject invention is the provision of a ratio measuring cup as described hereinabove which provides a series of calibration marks on each of the water and syrup chambers and wherein a difference of liquid heights within a given number of calibration marks indicates an acceptable reading.

In accordance with the teachings of a first preferred embodiment herein, the present invention provides a ratio cup for determining whether a dispenser is dispensing an acceptable ratio of water to syrup, with the cup comprising first and second adjacent chambers. The first chamber is designed to receive water dispensed from a nozzle, while the second chamber is designed to receive syrup dispensed from the nozzle and redirected thereto by a diverted tube. The cross-sectional areas of the water and syrup chambers are in substantially the ratio of the ideal water to syrup ratio in the dispensed product, and a vertically separated series of horizontal calibration marks are provided on each of the two chambers. In this arrangement, a mismatch of liquid heights can be translated into a reading of acceptability by being within a given number of lines of each other, such that the horizontal lines enable a tolerance band of acceptable mismatches to be readily seen visually. Alternatively, an unacceptable reading is indicated by the two liquid levels being more than the given number of lines apart. A distinct advantage of providing a series of horizontal calibration marks on both of the chambers is that the liquid levels can vary within the series of calibration marks and still allow a calibration reading to be taken at the different levels. Accordingly the accuracy of the readings remains satisfactory as long as the resultant liquid heights are somewhere within the range of horizontal calibration marks.

In greater detail, the first water chamber and the second syrup chamber preferably comprise adjacent substantially cylindrical chambers formed as one integral molded plastic unit. Moreover, the vertically separated series of horizontal calibration marks on each of the chambers are provided extending substantially around the entire circumference thereof, which assists a technician in leveling the ratio cup while taking a calibration reading.

In accordance with the teachings of a second preferred embodiment herein, the present invention provides a cup for determining whether a dispenser is dispensing an acceptable ratio of water to syrup, with the cup comprising first and second adjacent chambers. The first chamber is designed to receive water dispensed from a nozzle, while the second chamber is designed to receive syrup dispensed by the nozzle and redirected thereto by a diverter tube, with the cross sectional areas of the water and syrup chambers being substantially in the ratio of the ideal water to syrup ratio in the dispensed product. In the second embodiment, a slider element is provided and is vertically slideable along the height of the one of two chambers. The slider element has a horizontal calibration mark thereon to be aligned with one liquid level height and a horizontal tolerance range also marked thereon. In operation of this embodiment, when the second liquid level falls within the horizontal tolerance range, an acceptable ratio of water to syrup is indicated.

In greater detail, in the second disclosed embodiment, the slider element is vertically slideable along the second syrup chamber, the horizontal calibration mark is designed to be aligned with the syrup liquid level height, and the horizontal tolerance range is positioned immediately at and below the horizontal calibration mark, with the arrangement indicating as acceptable only syrup rich ratios of water to syrup.

BRIEF DESCRIPTION OF THE DRAWINGS

The foregoing objects and advantages of the present invention for a ratio measuring cup may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 5 and 6 illustrate a second preferred embodiment of a ratio cup pursuant to the present invention, wherein FIG. 5 is a top plan view thereof, and FIG. 6 is a vertical sectional view thereof taken along arrows 6—6 in FIG. 5.

DETAILED DESCRIPTION OF THE DRAWINGS

Figure 1:
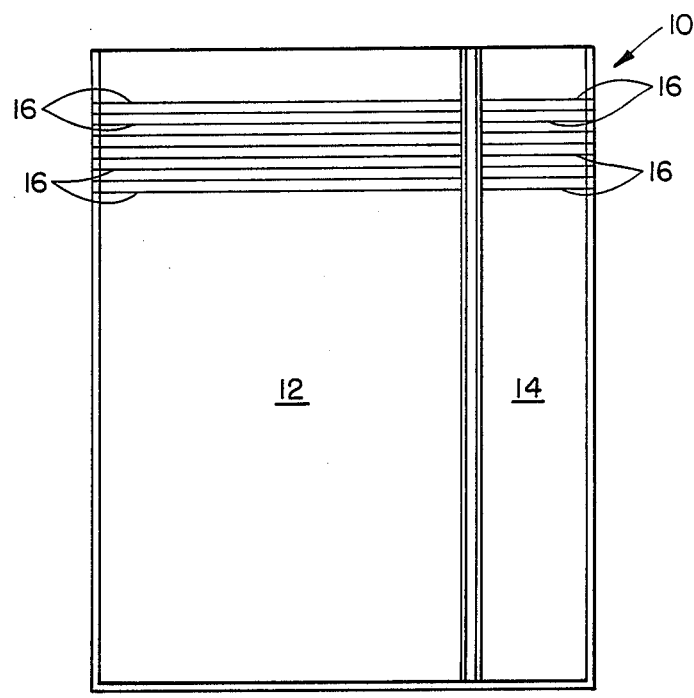
FIG. 1 is a front elevational view of first exemplary embodiment of a ratio cup constructed pursuant to the teachings of the present invention.

Referring to the drawings in detail, FIG. 1 is a front elevational view of an exemplary embodiment of a ratio cup constructed pursuant to the teachings of the present invention. The ratio cup is constructed with first and second adjacent cylindrical chambers 12 and 14. The first chamber is designed to receive water dispensed from a nozzle while the second chamber 14 is designed to receive syrup dispensed from the nozzle and redirected thereto by a diverter tube. The cross sectional areas of the water and syrup chambers are in the ratio of the ideal water to syrup ratio in the dispensed product, and a vertically separated series of horizontal calibration marks 16 are provided on each of the two chambers. In this arrangement, a mismatch of liquid heights can be translated into a reading of acceptability by being within a given number of lines of each other, such that the horizontal lines enable a tolerance band of acceptable mismatches to be readily seen visually. Alternatively, an unacceptable reading is indicated by the two liquid levels being more than the given number of lines apart. A distinct advantage of providing a series of horizontal calibration marks 16 on both of the chambers is that the liquid levels can vary within the series of calibration marks between the uppermost and lowermost marks and still allow a calibration reading to be taken at the different levels.

The ratio cup 10 is preferably formed as one integral molded plastic unit. The calibration marks 16 are preferable molded into the outsides of both chambers 12 and 14, and can extend completely around and circumscribe each chamber to enable the visual readings to be taken from virtually all sides thereof.

Figure 2:
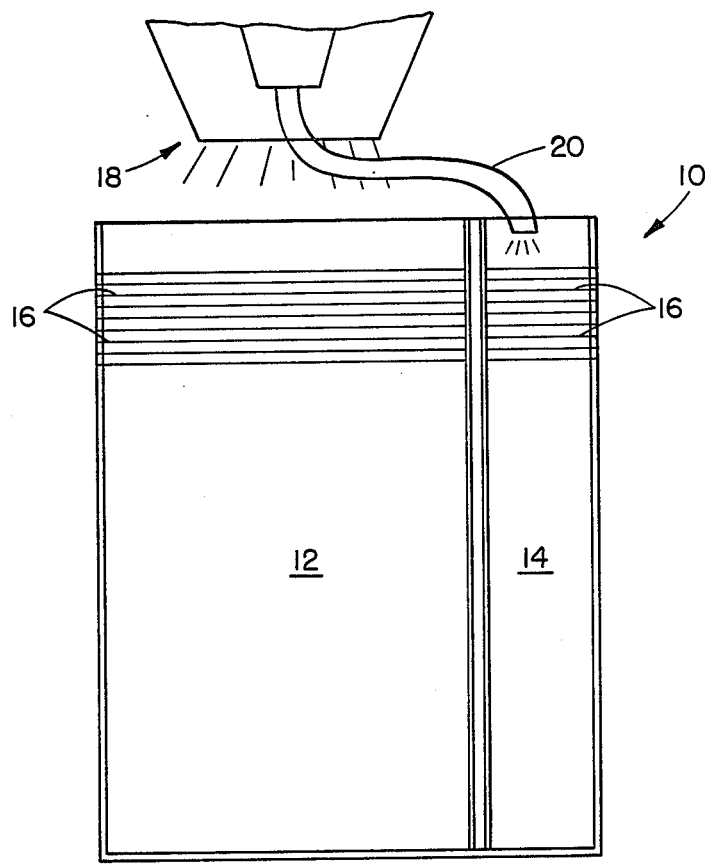
FIG. 2 illustrates the ratio cup of FIG. 1 positioned beneath a beverage dispensing nozzle, with a diverter tube being utilized to direct the flow of syrup to the syrup measuring chamber.

FIG. 2 illustrates the ratio cup 10 of FIG. 1 positioned beneath a beverage dispensing nozzle 18, with a diverter tube 20 being utilized to direct the flow of syrup to the syrup measuring chamber 14. The water flows straight down and around the diverter tube 20 into the water measuring chamber 14. The person taking the ratio measurement has a great deal of leeway in terminating the dispensing operation, and need only be concerned that both fluid levels be somewhere between the uppermost and lowermost calibration marks.

A simple set of instructions for a technician taking a measurement with a ratio cup of the illustrated embodiment could be as follows:

1. Attach syrup separator to valve per valve manufacturer's instructions.

2. Fill ratio cup with carbonated water and syrup. IMPORTANT: Fill into marked zone in one continuous pour; do not "top off."

3. Place cup on level surface. Water and syrup levels should be parallel to calibration marks. Adjust cup until level, if necessary, using liquid as a level.

4. Compare water and syrup columns. The water and syrup must be with two (2) lines of each other for an acceptable ratio reading. If not within acceptable limits, adjust syrup control and retest as above.

Figure 3:
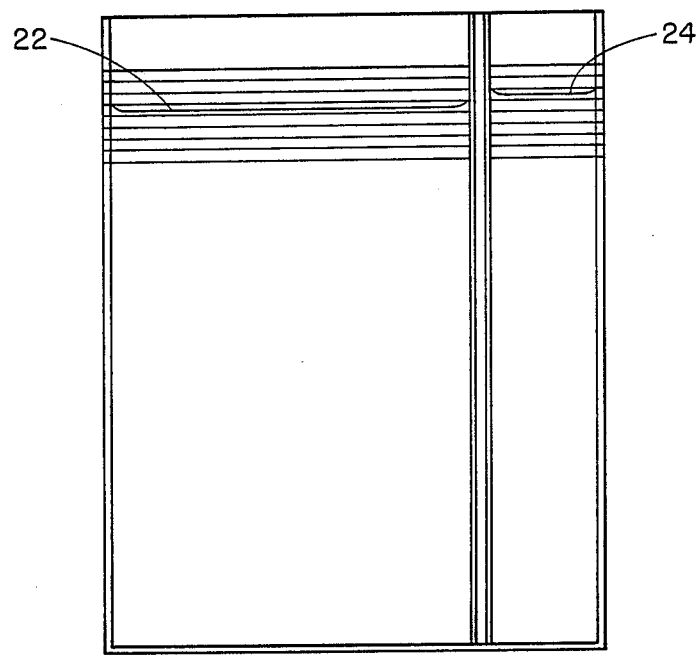
FIGS. 3 and 4 illustrate the ratio cup of FIGS. 1 and 2 in use with different ratio measurements, with FIG. 3 showing an acceptable reading, and FIG. 4 illustrating an unacceptable reading.
Figure 4:
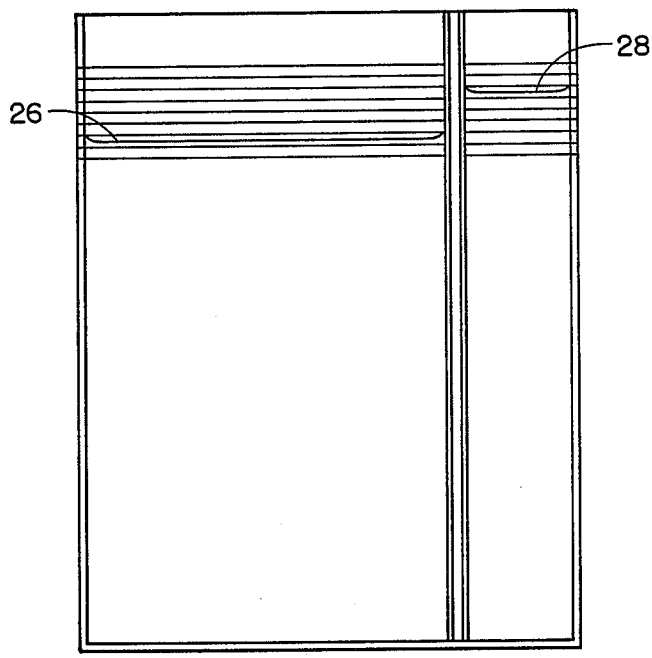

After filling both chambers to liquid heights within the series of calibration marks, the technician taking the measurement notes any mismatch in liquid column heights, For example, the ratio cup can be designed with the calibration marks 16 indicating an acceptable ratio reading if the heights 22,24 of the two liquid columns are within two calibration marks of each other, FIG. 3, and indicating an unacceptable reading if the heights 26,28 of the liquid columns are greater than within two calibration marks of each other, FIG. 4. The calibration marks 16 preferably circumscribe the cup, enabling the technician to easily establish a level position needed to use the calibration marks as a reference, tilting the cup until the fluid surfaces are parallel to the planes of the marks. The present invention is relatively simple, but provides an extremely useful tool to allow technicians to quickly and accurately determine whether a beverage dispenser is dispensing a beverage within specifications.

The ratio cup 10 can be designed in different sizes, and moreover the spacing and the number of calibration marks can differ in alternative embodiments. In general, the lowermost calibration mark will be placed at a height to allow given minimum quantities of fluid samples to be taken, and can extend upwardly therefrom. The spacings between the marks will generally be equal, but can also increase in an upward direction to account for the greater volume of the samples represented by the upper markings. Alternatively, the cross sections of the chambers can increase while the spacings between the calibration marks remain equal. The chambers need not be cylindrical, and could be other shapes, for instance oval or polygonal. The ratio cup need not be constructed of plastic, and glass, for instance, might be preferred for some embodiments.

In accordance with the teachings of a second preferred embodiment herein, the present invention provides a cup 30 for determining whether a dispenser is dispensing an acceptable ratio of water to syrup with the cup comprising first 32 and second 34 adjacent chambers. The first chamber 32 is designed to receive water dispensed from a nozzle, while the second chamber 34 is designed to receive syrup dispensed by the nozzle and redirected thereto by a diverter tube, with the cross sectional areas of the water and syrup chambers being substantially in the ratio of the ideal water to syrup ratio in the dispensed product. The tops of the first and second chambers are funnel shaped in this embodiment to make the dispensing operation easier.

In the second embodiment, a slider element 36 is provided and is vertically slideable along the height of the one of two chambers, preferably the smaller syrup chamber 34, and has a horizontal calibration mark 38 thereon, in this embodiment the top of the slider 36, which is designed to be aligned with the liquid level height of the syrup, and a vertically disposed tolerance range 40 also marked thereon. The tolerance range 40 extends from the first calibration mark 38 downwardly to a lower second calibration mark 41. In operation of this embodiment, the water and syrup are dispensed until the water level is at least to the MIN. FILL line. The syrup liquid level is then aligned with the calibration mark 38, and when the level of the water falls within the horizontal tolerance range 40, an acceptable ratio of water to syrup is indicated. Thus in FIG. 6 if the water level is at the MIN. FILL line and the syrup level is at mark 38, an acceptable ratio is indicated.

In greater detail, in the second disclosed embodiment, the horizontal tolerance range 40 is positioned at and immediately below the horizontal calibration mark 38, such that the arrangement indicates as acceptable only slightly syrup rich ratios of water to syrup, and has zero tolerance for syrup lean ratios.

Figure 5:
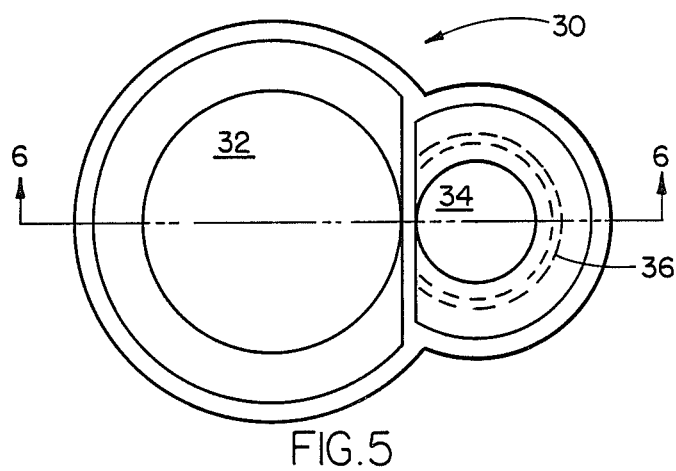
Figure 6:
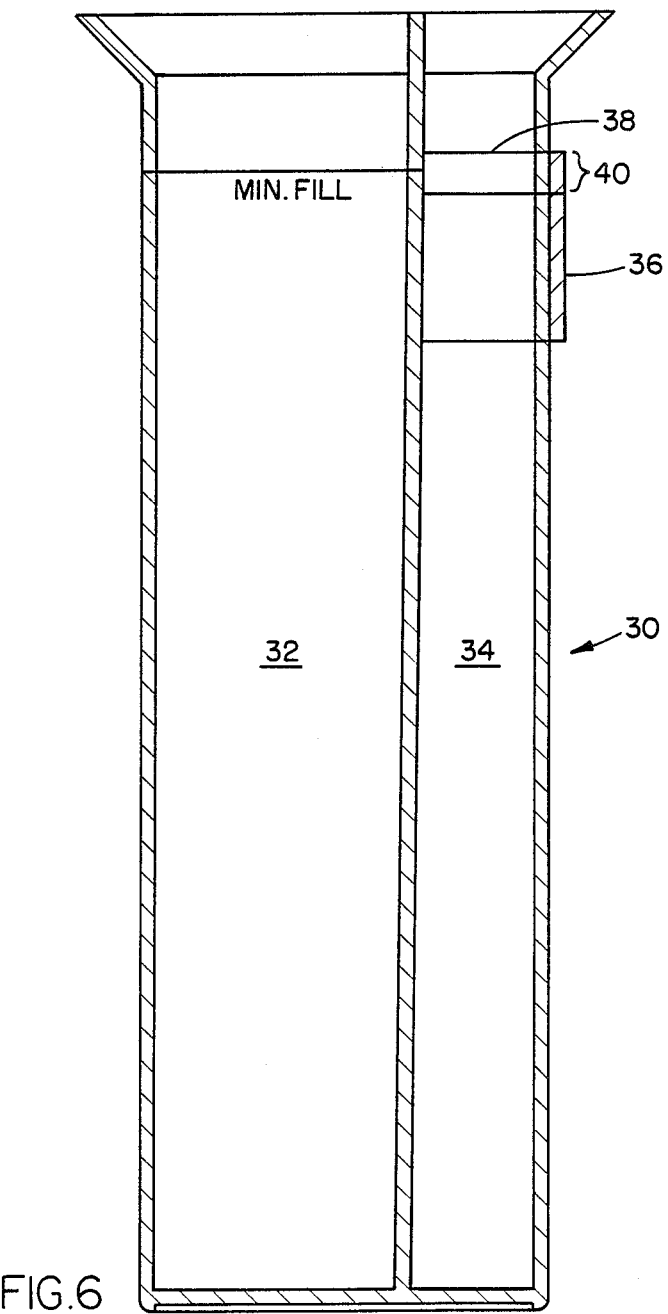
Figure 7:
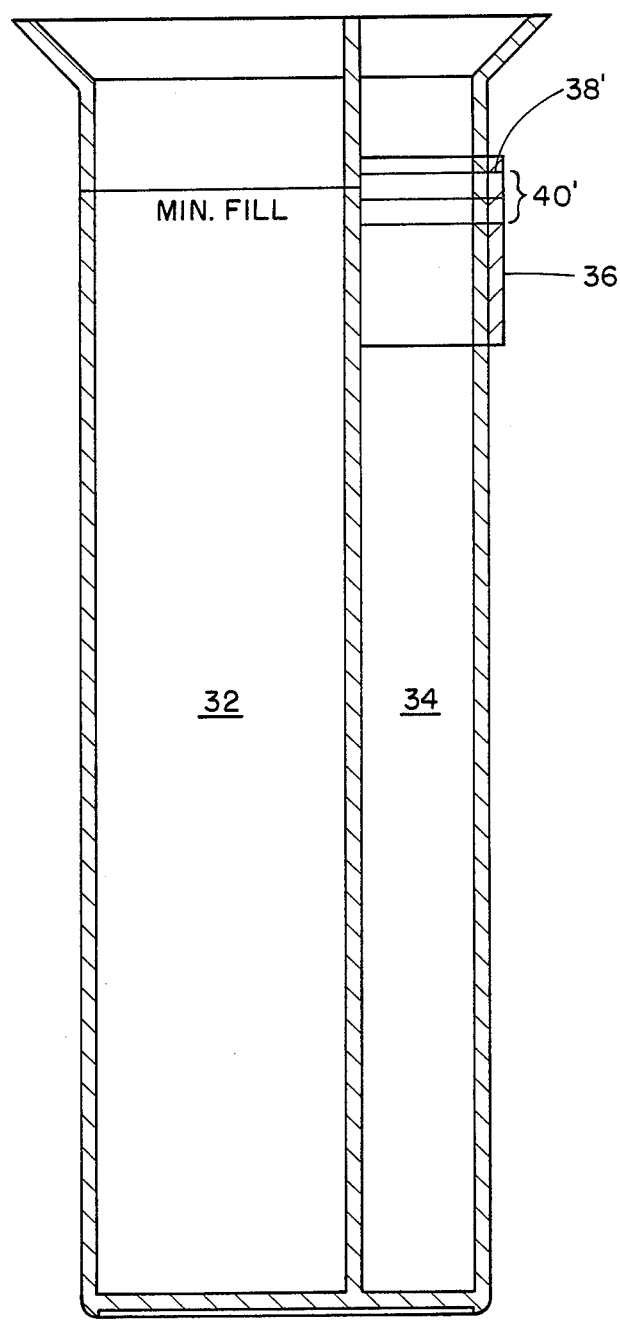
FIG. 7 illustrates a third embodiment of the subject invention similar to FIGS. 5 and 6 wherein the horizontal calibration mark and horizontal calibration line are altered slightly.

FIG. 7 illustrates a further embodiment of the present invention similar in concept to that of FIGS. 5 and 6, but wherein the horizontal tolerance range 40' is positioned equally above and below the horizontal calibration mark 38', such that a tolerance for both slightly syrup rich and slightly syrup lean mixture ratios is provided. Thus, in FIG. 7, if the water level is at the MIN. FILL line and the syrup level is at the calibration mark 38', an acceptable ratio is indicated, even though the indicated ratio is slightly syrup lean.

In alternative embodiments, the slider element could be mounted on the larger water chamber 32, and the the horizontal calibration mark and horizontal tolerance range could be arranged as appropriate for designation and demarcating either the height of the water level or the height of the syrup level.

While several embodiments and variations of the present invention for a ratio measuring cup are described in detail herein, it should be apparent that the disclosure and teachings of the present invention will suggest many alternative designs to those skilled in the art.

What is claimed is:

1. A cup for determining whether a dispenser is dispensing an acceptable ratio of water to syrup, comprising first and second adjacent, substantially non-opaque chambers, the first chamber being for receiving water dispensed from a nozzle, and the second chamber being for receiving syrup dispensed by the nozzle, with the cross sectional areas of the water and syrup chambers being substantially in the ratio of a predetermined water to syrup ratio in the dispensed product, and a slider element vertically slideable along the height one of said two chambers and having a first horizontal calibration mark thereon to be aligned with one liquid level height, and said slider element also having a second horizontal calibration mark thereon displaced vertically from said first horizontal calibration mark, with the distance between said first and second calibration marks defining a vertically disposed tolerance range, which when the second level height falls within said tolerance range indicates an acceptable ratio of water to syrup.

2. A cup for detemrning whether a dispenser is dispensing an acceptable ratio of water to syrup, as claimed in claim 1, said first water chamber and said second syrup chamber comprising adjacent substantially cylindrical chambers.

3. A cup for determining whether a dispenser is dispensing an acceptable ratio of water to syrup, as claimed in claim 1, said slider element being vertically slideable along the second syrup chamber, said horizontal calibration mark being aligned with the syrup liquid height, and said second horizontal calibration mark being below said first horizontal tolerance calibration mark to indicate as acceptable only slightly syrup rich ratios of water to syrup.

4. A cup for determining whether a dispenser is dispensing an acceptable ratio of water to syrup, as claimed in claim 3, said first water chamber and said second syrup chamber formed as one integral molded plastic unit.

* * * * *